(12) United States Patent
Di et al.

(10) Patent No.: US 12,411,238 B2
(45) Date of Patent: Sep. 9, 2025

(54) LASER RADAR DRIVING ENVIRONMENTAL RECOGNITION SYSTEM BASED ON VISUAL AREA GUIDANCE

(71) Applicant: DONGGUAN UNIVERSITY OF TECHNOLOGY, Dongguan (CN)

(72) Inventors: Bo Di, Dongguan (CN); Lifei Zhang, Dongguan (CN); Yu Zheng, Dongguan (CN); Renyuan Qin, Dongguan (CN); Hongwei Ma, Dongguan (CN)

( * ) Notice: Subject to any disclaimer, the term of this patent is extended or adjusted under 35 U.S.C. 154(b) by 0 days.

(21) Appl. No.: 18/546,090

(22) PCT Filed: Dec. 2, 2022

(86) PCT No.: PCT/CN2022/136141
§ 371 (c)(1),
(2) Date: Aug. 10, 2023

(87) PCT Pub. No.: WO2023/179086
PCT Pub. Date: Sep. 28, 2023

(65) Prior Publication Data
US 2025/0208292 A1    Jun. 26, 2025

(30) Foreign Application Priority Data
Aug. 26, 2022    (CN) .......................... 202211034263.5

(51) Int. Cl.
*G01S 17/42*    (2006.01)
*G01S 7/48*    (2006.01)
(Continued)

(52) U.S. Cl.
CPC ............ *G01S 17/42* (2013.01); *G01S 7/4808* (2013.01); *G01S 17/58* (2013.01); *G01S 17/86* (2020.01); *G01S 17/931* (2020.01)

(58) Field of Classification Search
CPC ........ G01S 17/42; G01S 7/4808; G01S 17/58; G01S 17/86; G01S 17/931
See application file for complete search history.

(56) References Cited

U.S. PATENT DOCUMENTS 11,113,584 B2 *  9/2021  Deng ..................... G01S 17/86
2021/0190914 A1 *  6/2021  Kunz ..................... G01S 17/06
(Continued)

FOREIGN PATENT DOCUMENTS

CN    109268647 A    1/2019

OTHER PUBLICATIONS

Research on Multi-target Fault-tolerant Tracking and Trajectory Prediction of Unmanned Vehicles, Liu Chuang, China Honors Bachelor's thesis full-text database Engineering Science and Technology Series II; Issue 8, 2019, No. 3, pp. 74-75 C035-144; Document contains 5 pages, total: p. 1: bibliographic information; p. 2: cover sheet; p. 3: abstract; pp. 4-5: pp. 74-75 of the reference document; pp. 1-5.
CN202211034263.5 First Office Action dated May 19, 2023, original Chinese pp. 1-6.
(Continued)

*Primary Examiner* — Isam A Alsomiri
*Assistant Examiner* — Joseph C Fritchman
(74) *Attorney, Agent, or Firm* — Addison D. Ault; IPGentleman Intellectual Property Services, LLC

(57) ABSTRACT

Embodiments of the present disclosure provide a laser radar driving environmental recognition system based on visual area guidance, including a visual system, a laser radar system, a data processing module and a vehicle action control module. The data processing module includes: a streaming media analysis module; a key target spherical coordinate data processing module; a key target three-dimensional trajectory prediction module, wherein the laser radar system is configured for measuring real distances of the key targets, and outputting real spherical coordinates of
(Continued)

key targets to the key target three-dimensional trajectory prediction module, the key target three-dimensional trajectory prediction module being configured for generating real-time trajectory prediction data of key targets, and outputting the real-time trajectory prediction data of key targets to the vehicle action control module. The laser radar driving environmental recognition system can achieve accurate measurement of key targets and prediction of movement trajectories.

7 Claims, 6 Drawing Sheets

(51) Int. Cl.
    *G01S 17/58*     (2006.01)
    *G01S 17/86*     (2020.01)
    *G01S 17/931*     (2020.01)

(56) References Cited

U.S. PATENT DOCUMENTS

| | | | |
|---|---|---|---|
| 2021/0311195 A1 | 10/2021 | Mahajan et al. | |
| 2021/0389467 A1* | 12/2021 | Eshel | G01S 7/4804 |
| 2025/0131836 A1* | 4/2025 | Gu | G08G 5/51 |

OTHER PUBLICATIONS

CN202211034263.5 First Office Action dated May 19, 2023, English machine translation generated Apr. 7, 2024, pp. 1-7.

* cited by examiner

LASER RADAR DRIVING
ENVIRONMENTAL RECOGNITION SYSTEM
BASED ON VISUAL AREA GUIDANCE

TECHNICAL FIELD

The present disclosure relates to the field of intelligent driving environmental recognition technology, and in particular to a laser radar driving environmental recognition system based on visual area guidance.

BACKGROUND

A self-driving automobile, also known as an unmanned automobile, a computer-driven automobile or a wheeled mobile robot, is an intelligent automobile that realizes driverless driving through a computer system. Herein, the self-driving automobile relies on the collaboration of artificial intelligence, visual computing, radar, monitoring devices and positioning system, to allow a computer to operate the motor vehicle automatically and safely without any active human intervention.

With the continuous development of intelligent driving technology, it is particularly important for vehicles to recognize and monitor targets in the surrounding environment. The vehicle's recognition and monitoring of the targets in the surrounding environment is mainly realized by one of the following systems: pure visual recognition system, laser radar recognition system, or millimeter-wave radar recognition system.

It should be pointed out that for the pure visual recognition system, it has wide-area recognition capability, however, in the process of using the pure visual recognition system to realize the recognition and monitoring of the targets in the vehicle's surrounding environment, it is necessary to incorporate with high-performance artificial intelligence neural network auxiliary algorithms, and perform a large-scale, long-term data collection and learning process, therefore it has a disadvantage of long evolution cycle. Further, there are also leakage risks of map data and sensitive information.

For the laser radar recognition system, it has an advantage of high accuracy for distance measurement, however, the mechanical parts of the laser radar recognition system are prone to damage under the condition of vehicle vibration, and the existing laser radar recognition system needs to pursue for high laser spot scanning density, and environmental objects can only be effectively recognized and distinguished under the condition of higher laser spot scanning density. Further, the laser radar recognition system cannot recognize color information of the object, and it is expensive, bulky, and inconvenient for large-scale vehicle applications. In addition, in order to improve the recognition accuracy of the existing laser radar recognition system, it is necessary to continuously increase the number of measuring points, thereby increasing the detection cost; that is, the laser radar recognition system has problems of excessively large laser radar scanning range (scanning without distinction in the whole area), waste of scanning resources, and insufficient scanning dot density in key area.

For the millimeter-wave radar recognition system, the millimeter-wave radar has a problem of limited detection range and accuracy, therefore it is only suitable for auxiliary detection to judge obstacles in front of and behind the vehicle.

SUMMARY

In view of the above-mentioned problems, the object of the present disclosure is to provide a laser radar driving environmental recognition system based on visual area guidance. A visual system and a laser radar system are effectively combined to form the laser radar driving environmental recognition system based on visual area guidance, so as to achieve accurate measurement of key targets and prediction of movement trajectories, thereby avoiding the defects of large amount of calculation in the existing pure visual recognition system and waste of laser dot scanning resources and insufficient scanning dot density in key area in the existing laser radar recognition system.

The technical solutions of the present disclosure include:

A laser radar driving environmental recognition system based on visual area guidance, comprising a visual system, a laser radar system, a data processing module and a vehicle action control module, wherein the data processing module comprises:

a streaming media analysis module, configured for analyzing and processing streaming media data of a vehicle driving environment sampled by the visual system, to classify and determine moving objects and stationary objects in the vehicle driving environment, and mark the moving objects as key targets and output spherical coordinates of key targets, the streaming media analysis module being configured for outputting data of the stationary objects to the vehicle action control module;

a key target spherical coordinate data processing module, configured for analyzing and processing spherical coordinate data of key targets output by the streaming media analysis module, and outputting azimuth coordinates in the processed spherical coordinates of key targets to the laser radar system;

a key target three-dimensional trajectory prediction module, wherein the laser radar system is configured for measuring real distances of the key targets, and outputting real spherical coordinates of key targets to the key target three-dimensional trajectory prediction module, the key target three-dimensional trajectory prediction module being configured for generating real-time trajectory prediction data of key targets, and outputting the real-time trajectory prediction data of key targets to the vehicle action control module.

According to some embodiments of the present disclosure, the laser radar driving environmental recognition system is configured for implementing driving environmental recognition and feedback in such a method, the method comprising:

step a: sampling environmental streaming media of a vehicle driving environment through the visual system;

step b: sending by the visual system the sampled environmental streaming media data to the streaming media analysis module, and analyzing and processing by the streaming media analysis module the environmental streaming media data sampled by the visual system to classify and determine moving objects and stationary objects in the vehicle driving environment, and mark the moving objects as key targets and output spherical coordinates of key targets;

outputting stationary object data of the streaming media analysis module to the vehicle action control module, so that the vehicle action control module is capable of controlling driving status of vehicle according to the stationary object information;

meanwhile, outputting by the streaming media analysis module the spherical coordinate data of key targets to the key target spherical coordinate data processing module;

step c: analyzing and processing by the key target spherical coordinate data processing module the spherical coordinates of key targets, and inputting azimuth coordinates in the processed spherical coordinates of key targets to the laser radar system;

step d: accurately measuring by the laser radar system the real distance of the key targets, and outputting the real spherical coordinates of key targets to the key target three-dimensional trajectory prediction module;

step e: generating by the key target three-dimensional trajectory prediction module the real-time trajectory prediction data of key targets according to the real spherical coordinate data of key targets;

step f: outputting by the key target three-dimensional trajectory prediction module the real-time trajectory prediction data of key targets to the vehicle action control module, so that the vehicle action control module is capable of controlling driving status of vehicle according to moving object information.

According to some embodiments of the present disclosure, in the step d, in case of a driving vehicle as key target, the laser radar system is configured to select four measuring points of the same vehicle as key target to measure distances, the laser radar system accurately measures real distances of the above four measuring points of the vehicle as key target, and outputs real spherical coordinates of the above four measuring points of the vehicle as key target to the key target three-dimensional trajectory prediction module, wherein two measuring points form a measuring point group, that is, the four measuring points form two measuring point groups;

for a vehicle as key target traveling in the same direction and located in the left front, the above four measuring points are a right front wheel, a right rear wheel, a left rear light, and a right rear light of the vehicle as key target in sequence, wherein the measuring point of right front wheel and the measuring point of right rear wheel form a measuring point group, and the measuring point of left rear light and the measuring point of right rear light form a measuring point group;

for a vehicle as key target traveling in the same direction and located in the right front, the above four measuring points are a left front wheel, a left rear wheel, a left rear light, and a right rear light of the vehicle as key target in sequence, wherein the measuring point of left front wheel and the measuring point of left rear wheel form a measuring point group, and the measuring point of left rear light and the measuring point of right rear light form a measuring point group;

for a vehicle as key target traveling in the same direction and located in the left rear, the above four measuring points are a right front wheel, a right rear wheel, a left front light, and a right front light of the vehicle as key target in sequence, wherein the measuring point of right front wheel and the measuring point of right rear wheel form a measuring point group, and the measuring point of left front light and the measuring point of right front light form a measuring point group;

for a vehicle as key target traveling in the same direction and located in the right rear, the above four measuring points are a left front wheel, a left rear wheel, a left front light, and a right front light of the vehicle as key target in sequence, wherein the measuring point of left front wheel and the measuring point of left rear wheel form a measuring point group, and the measuring point of left front light and the measuring point of right front light form a measuring point group;

for a vehicle as key target traveling in the same direction and located directly in front, the above four measuring points are a left rear wheel, a right rear wheel, a left rear light, and a right rear light of the vehicle as key target in sequence, wherein the measuring point of left rear wheel and the measuring point of right rear wheel form a measuring point group, and the measuring point of left rear light and the measuring point of right rear light form a measuring point group;

for a vehicle as key target traveling in the same direction and located directly in the rear, the above four measuring points are a left front wheel, a right front wheel, a left front light, and a right front light of the vehicle as key target in sequence, wherein the measuring point of left front wheel and the measuring point of right front wheel form a measuring point group, and the measuring point of left front light and the measuring point of right front light form a measuring point group;

for a vehicle as key target traveling in a reverse direction and located in the left front, the above four measuring points are a left front wheel, a left rear wheel, a left front light, and a right front light of the vehicle as key target in sequence, wherein the measuring point of left front wheel and the measuring point of left rear wheel form a measuring point group, and the measuring point of left front light and the measuring point of right front light form a measuring point group;

for a vehicle as key target traveling in a reverse direction and located in the right front, the above four measuring points are a right front wheel, a right rear wheel, a left front light, and a right front light of the vehicle as key target in sequence, wherein the measuring point of right front wheel and the measuring point of right rear wheel form a measuring point group, and the measuring point of left front light and the measuring point of right front light form a measuring point group.

According to some embodiments of the present disclosure, in the step d, in case of a multi-wheeled truck as key target, the laser radar system is configured to select at least three measuring points of the same multi-wheeled truck as key target to measure distances, the laser radar system accurately measures real distance of each measuring point of the multi-wheeled truck as key target, and outputs real spherical coordinates of each measuring point to the key target three-dimensional trajectory prediction module;

for a multi-wheeled truck as key target traveling in the same direction and located in the left front, at least three outer wheels on the right side of the multi-wheeled truck as key target are selected as measuring points;

for a multi-wheeled truck as key target traveling in the same direction and located in the right front, at least three outer wheels on the left side of the multi-wheeled truck as key target are selected as measuring points;

for a multi-wheeled truck as key target traveling in the same direction and located in the left rear, at least three outer wheels on the right side of the multi-wheeled truck as key target are selected as measuring points;

for a multi-wheeled truck as key target traveling in the same direction and located in the right rear, at least three outer wheels on the left side of the multi-wheeled truck as key target are selected as measuring points;

for a multi-wheeled truck as key target traveling in a reverse direction and located in the left front, at least three outer wheels on the left side of the multi-wheeled truck as key target are selected as measuring points;

for a multi-wheeled truck as key target traveling in a reverse direction and located in the right front, at least three outer wheels on the right side of the multi-wheeled truck as key target are selected as measuring points.

According to some embodiments of the present disclosure, the visual system comprises six vehicle-mounted cameras, respectively arranged in the middle of the upper end of a front windshield, the left side of the upper end of the front windshield, the right side of the upper end of the front windshield, the upper part of a A-pillar, the upper part of a B-pillar, and the middle of the upper end of a rear windshield of the vehicle, the vehicle-mounted cameras are all wide-angle cameras, with a field of view higher than 90 degrees.

According to some embodiments of the present disclosure, a shooting frame rate of the vehicle-mounted cameras is 30-50 frames, and the visual system has a data processing frequency of 30-50 Hz.

According to some embodiments of the present disclosure, the laser radar system is a solid-state laser radar system, and the laser radar system comprises four high-precision positioning solid-state laser radars arranged in the middle of the upper end of the front windshield, the upper part of a A-pillar, the upper part of a B-pillar, and the middle of the upper end of the rear windshield of the vehicle, and the high-precision positioning solid-state laser radars are all solid-state optical waveguides phased array laser radars.

According to some embodiments of the present disclosure, the stationary objects comprise stationary vehicles, lane edges, buildings, fire facilities, and traffic signs.

According to some embodiments of the present disclosure, in the step b, during determining the spherical coordinates of key targets by the streaming media analysis module, the streaming media analysis module performs real-time processing of the streaming media data of the vehicle driving environment sampled by the visual system in a form of streaming media, and determines the spherical coordinates (r', θ, φ) of key targets with a fixed camera coordinate positioning method, where θ and φ are definite values respectively, and r' is a value to be corrected.

According to some embodiments of the present disclosure, in the step d, during measuring the real spherical coordinates of key targets by the laser radar system, the laser radar system performs vector control on the laser through electro-optic effect, to detect corrected spherical coordinates (r, θ, φ) of key targets, and then obtains the real spherical coordinates of key targets.

Compared with the prior art, the beneficial effects of the present disclosure include: the laser radar driving environmental recognition system based on visual area guidance described in the present disclosure includes a visual system, a laser radar system, and a data processing module, and the data processing module includes a streaming media analysis module, a key target spherical coordinate data processing module, and a key target three-dimensional trajectory prediction module. The visual system samples the environmental streaming media of the vehicle driving environment; the streaming media analysis module analyzes and processes the environmental streaming media data sampled by the visual system to classify and determine moving objects and stationary objects in the vehicle driving environment, and mark the moving objects as key targets and output spherical coordinates of key targets; the key target spherical coordinate data processing module analyzes and processes the spherical coordinates of key targets, and inputs azimuth coordinates in the processed spherical coordinates of key targets to the laser radar system; the laser radar system accurately measures the real distance of the key targets, and outputs the real spherical coordinates of key targets to the key target three-dimensional trajectory prediction module, the key target three-dimensional trajectory prediction module generates the real-time trajectory prediction data of key targets. Further, a visual system and a laser radar system are effectively combined to form the laser radar driving environmental recognition system based on visual area guidance, so as to achieve accurate measurement of key targets and prediction of movement trajectories, thereby avoiding the deficiencies of the large amount of calculation associated with the existing pure visual recognition system and the waste of laser dot scanning resources and insufficient scanning dot density over key areas associated with the existing laser radar recognition system.

1—vehicle-mounted camera; 2—streaming media analysis module; 3—key target spherical coordinate data processing module; 4—solid-state laser radar; 5—key target three-dimensional trajectory prediction module; 6—vehicle action control module.

DETAILED DESCRIPTION OF EMBODIMENTS

The specific embodiments of the present disclosure will be described in detail below in conjunction with the accompanying drawings, but it should be understood that the protection scope of the present disclosure is not limited to the specific embodiments.

Figure 1:
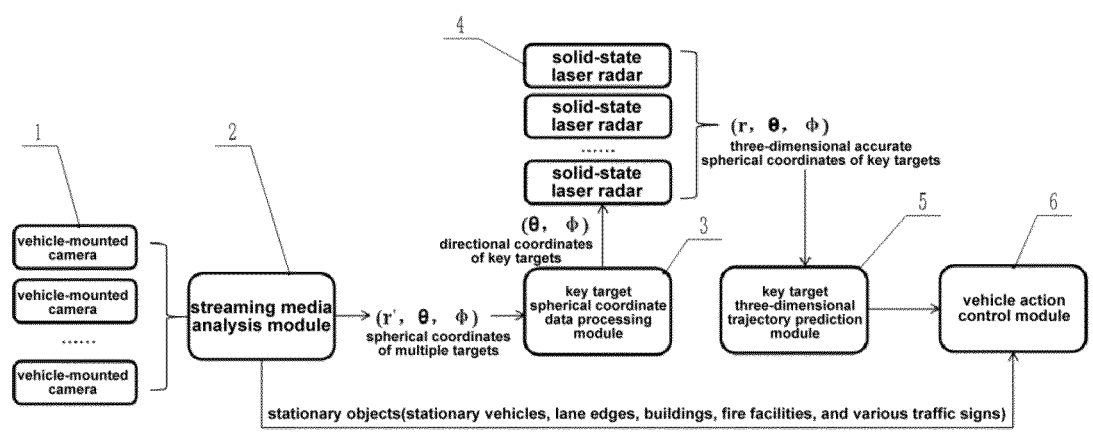
FIG. 1 is a schematic diagram of the operation logic of the present disclosure.
Figure 2:
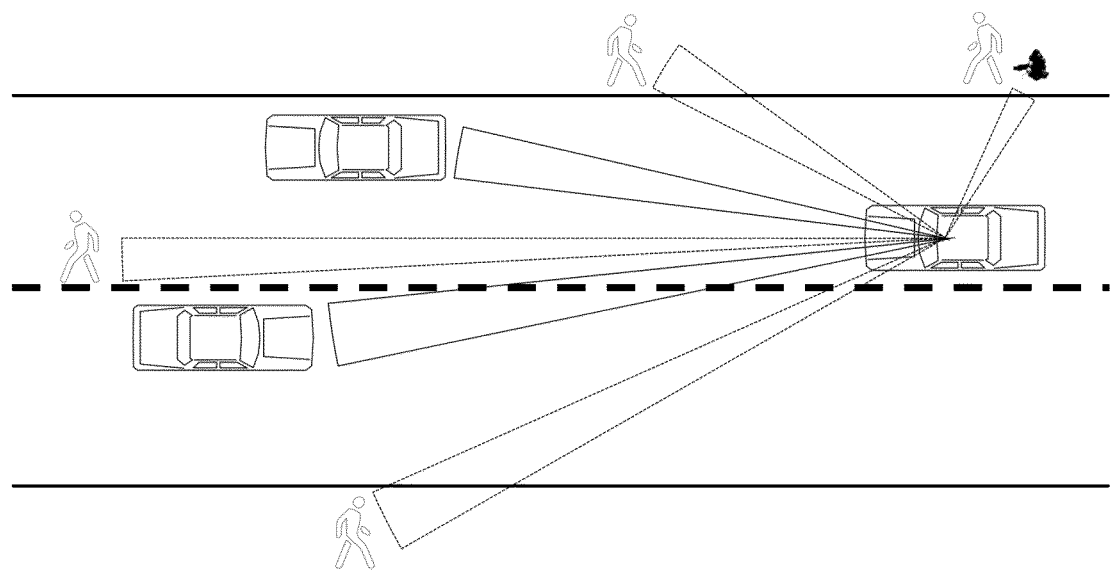
FIG. 2 is a schematic diagram showing the tracking of key targets in the present disclosure.

As shown in FIGS. 1-2, the laser radar driving environmental recognition system based on visual area guidance includes a visual system, a laser radar system, a data processing module and a vehicle action control module 6.

Figure 3:
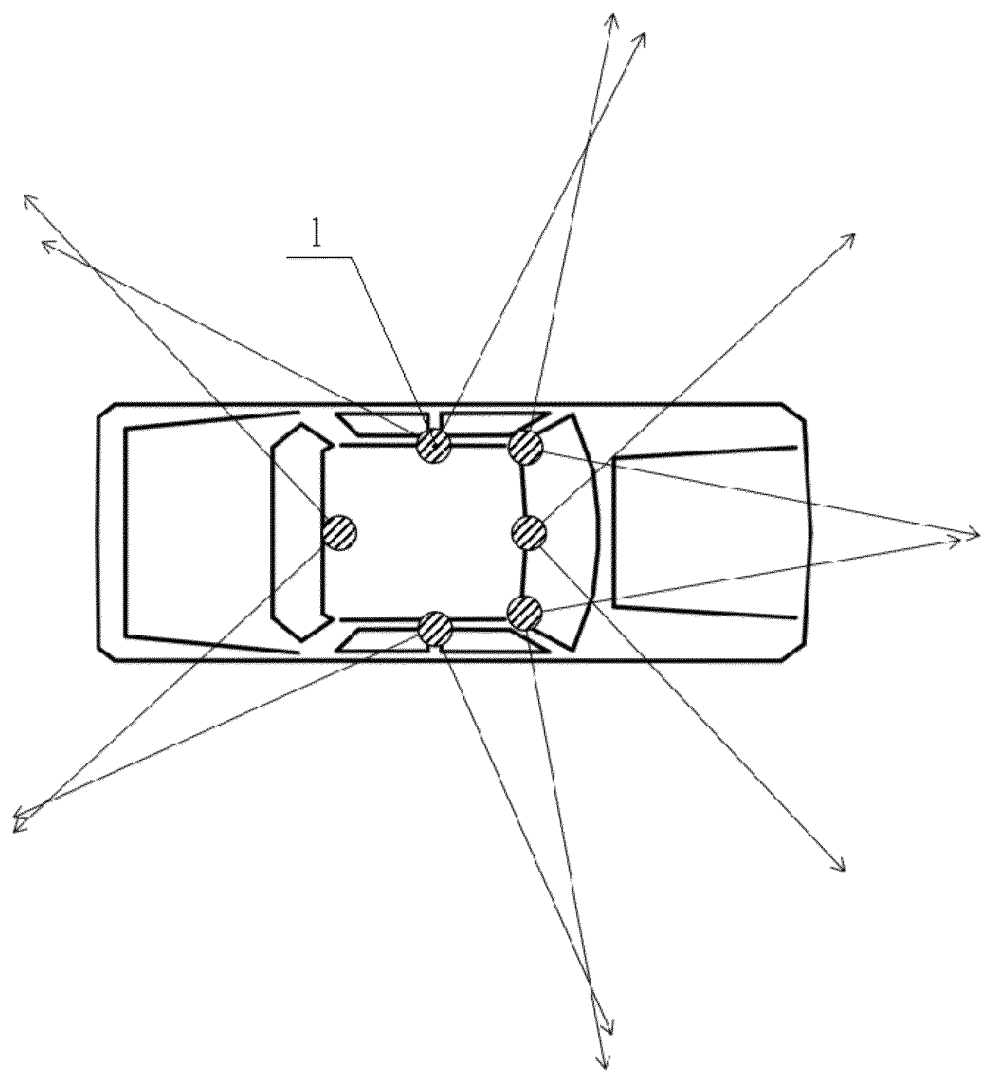
FIG. 3 is a schematic diagram showing the installation of vehicle-mounted cameras in the visual system of the present disclosure.

As shown in FIG. 3, the visual system includes six vehicle-mounted cameras 1, respectively arranged in the middle of the upper end of a front windshield, the left side of the upper end of the front windshield, the right side of the upper end of the front windshield, the upper part of a A-pillar, the upper part of a B-pillar, and the middle of the upper end of a rear windshield of the vehicle, the vehicle-mounted cameras 1 are all wide-angle cameras, with a field of view higher than 90 degrees. The shooting frame rate of the vehicle-mounted cameras 1 is 30-50 frames, and the data processing frequency of the visual system is 30-50 Hz.

Figure 4:
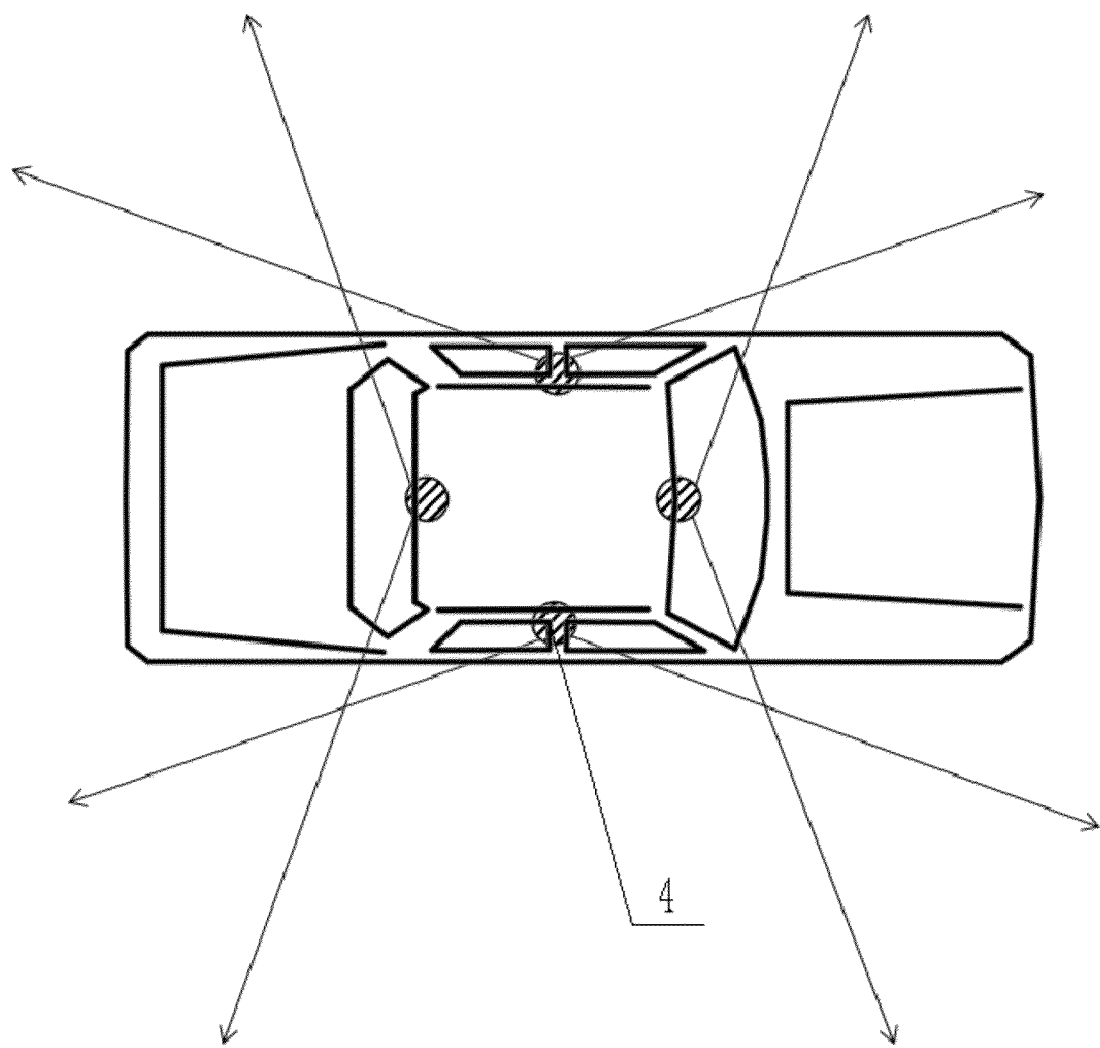
FIG. 4 is a schematic diagram showing the installation of solid-state optical waveguides phased array laser radars in the laser radar system of the present disclosure.

As shown in FIG. 4, the laser radar system is a solid-state laser radar system, and the laser radar system includes four high-precision positioning solid-state laser radars 4 arranged in the middle of the upper end of the front windshield, the upper part of a A-pillar, the upper part of a B-pillar, and the middle of the upper end of the rear windshield of the vehicle, and the high-precision positioning solid-state laser radars 4 are all solid-state optical waveguides phased array laser radars.

The data processing module includes a streaming media analysis module 2, a key target spherical coordinate data processing module 3 and a key target three-dimensional trajectory prediction module 5. The streaming media analysis module 2 can analyze and process the streaming media data of the vehicle driving environment sampled by the visual system, to classify and determine moving objects and stationary objects in the vehicle driving environment, and mark the moving objects as key targets and output the spherical coordinates of the key targets, the streaming media analysis module 2 can output the data of the stationary objects to the vehicle action control module 6. The stationary objects include stationary vehicles, lane edges, buildings, fire facilities, and traffic signs. The key target spherical coordinate data processing module 3 can analyze and process the spherical coordinate data of key targets output by the streaming media analysis module 2, and output azimuth coordinates in the processed spherical coordinates of key targets to the laser radar system. For the key target three-dimensional trajectory prediction module 5, the laser radar system can measure the real distance of the key target, and output the real spherical coordinates of key targets to the key target three-dimensional trajectory prediction module 5, the key target three-dimensional trajectory prediction module 5 can generate real-time trajectory prediction data of key targets, and output the real-time trajectory prediction data of key targets to the vehicle action control module 6.

The above-mentioned embodiment adopts the following method to implement driving environmental recognition and feedback, the method includes:

step a: sampling environmental streaming media of a vehicle driving environment through the visual system;

step b: sending by the visual system the sampled environmental streaming media data to the streaming media analysis module 2, and analyzing and processing by the streaming media analysis module 2 the environmental streaming media data sampled by the visual system to classify and determine moving objects and stationary objects in the vehicle driving environment, and mark the moving objects as key targets and output spherical coordinates of key targets;

outputting stationary object data of the streaming media analysis module 2 to the vehicle action control module 6, so that the vehicle action control module 6 is capable of controlling driving status of vehicle according to the stationary object information;

meanwhile, outputting by the streaming media analysis module 2 the spherical coordinate data of key targets to the key target spherical coordinate data processing module 3;

step c: analyzing and processing by the key target spherical coordinate data processing module 3 the spherical coordinates of key targets, and inputting azimuth coordinates in the processed spherical coordinates of key targets to the laser radar system;

step d: accurately measuring by the laser radar system the real distance of the key targets, and outputting the real spherical coordinates of key targets to the key target three-dimensional trajectory prediction module 5;

step e: generating by the key target three-dimensional trajectory prediction module 5 the real-time trajectory prediction data of key targets according to the real spherical coordinate data of key targets;

step f: outputting by the key target three-dimensional trajectory prediction module 5 the real-time trajectory prediction data of key targets to the vehicle action control module 6, so that the vehicle action control module 6 is capable of controlling driving status of vehicle according to moving object information.

Figure 5:
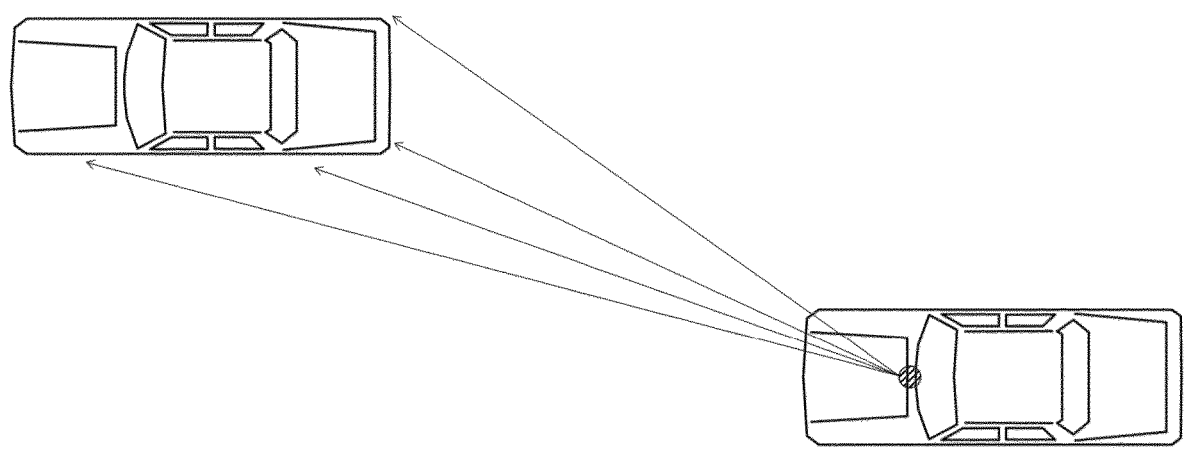
FIG. 5 is a schematic diagram showing the measurement of the laser radar system for the case where the key target is a driving vehicle.

As shown in FIG. 5, in the step d, in case of a driving vehicle as key target, the laser radar system is configured to select four measuring points of the same vehicle as key target to measure distances, the laser radar system accurately measures real distances of the above four measuring points of the vehicle as key target, and outputs real spherical coordinates of the above four measuring points of the vehicle as key target to the key target three-dimensional trajectory prediction module 5, wherein two measuring points form a measuring point group, that is, the four measuring points form two measuring point groups;

for a vehicle as key target traveling in the same direction and located in the left front, the above four measuring points are a right front wheel, a right rear wheel, a left rear light, and a right rear light of the vehicle as key target in sequence, wherein the measuring point of right front wheel and the measuring point of right rear wheel form a measuring point group, and the measuring point of left rear light and the measuring point of right rear light form a measuring point group;

for a vehicle as key target traveling in the same direction and located in the right front, the above four measuring points are a left front wheel, a left rear wheel, a left rear light, and a right rear light of the vehicle as key target in sequence, wherein the measuring point of left front wheel and the measuring point of left rear wheel form a measuring point group, and the measuring point of left rear light and the measuring point of right rear light form a measuring point group;

for a vehicle as key target traveling in the same direction and located in the left rear, the above four measuring points are a right front wheel, a right rear wheel, a left front light, and a right front light of the vehicle as key target in sequence, wherein the measuring point of right front wheel and the measuring point of right rear wheel form a measuring point group, and the measuring point of left front light and the measuring point of right front light form a measuring point group;

for a vehicle as key target traveling in the same direction and located in the right rear, the above four measuring points are a left front wheel, a left rear wheel, a left front light, and a right front light of the vehicle as key target in sequence, wherein the measuring point of left front wheel and the measuring point of left rear wheel form a measuring point group, and the measuring point of left front light and the measuring point of right front light form a measuring point group;

for a vehicle as key target traveling in the same direction and located directly in front, the above four measuring points are a left rear wheel, a right rear wheel, a left rear light, and a right rear light of the vehicle as key target in sequence, wherein the measuring point of left rear wheel and the measuring point of right rear wheel form a measuring point group, and the measuring point of left rear light and the measuring point of right rear light form a measuring point group;

for a vehicle as key target traveling in the same direction and located directly in the rear, the above four measuring points are a left front wheel, a right front wheel, a left front light, and a right front light of the vehicle as key target in sequence, wherein the measuring point of left front wheel and the measuring point of right front wheel form a measuring point group, and the measuring point of left front light and the measuring point of right front light form a measuring point group;

for a vehicle as key target traveling in a reverse direction and located in the left front, the above four measuring points are a left front wheel, a left rear wheel, a left front light, and a right front light of the vehicle as key target in sequence, wherein the measuring point of left front wheel and the measuring point of left rear wheel form a measuring point group, and the measuring point of left front light and the measuring point of right front light form a measuring point group;

for a vehicle as key target traveling in a reverse direction and located in the right front, the above four measuring points are a right front wheel, a right rear wheel, a left front light, and a right front light of the vehicle as key target in sequence, wherein the measuring point of right front wheel and the measuring point of right rear wheel form a measuring point group, and the measuring point of left front light and the measuring point of right front light form a measuring point group.

Figure 6:
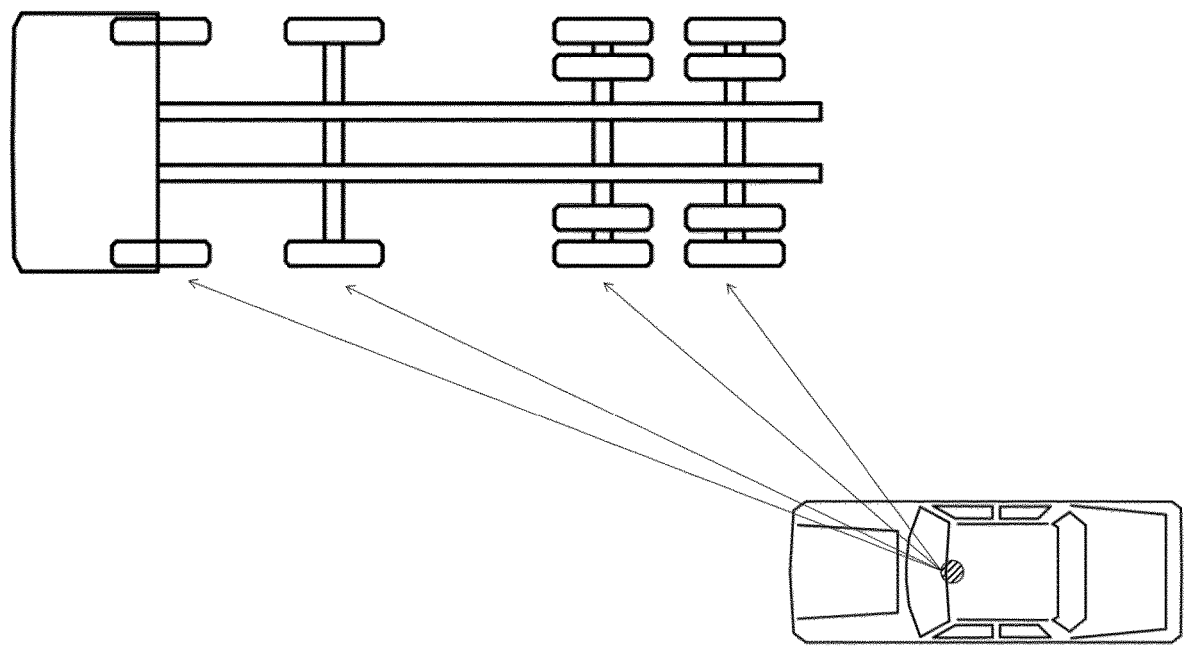
FIG. 6 is a schematic diagram showing the measurement of the laser radar system for the case where the key target is a multi-wheeled truck.

As shown in FIG. 6, in the step d, in case of a multi-wheeled truck as key target, the laser radar system is configured to select at least three measuring points of the same multi-wheeled truck as key target to measure distances, the laser radar system accurately measures real distance of each measuring point of the multi-wheeled truck as key target, and outputs real spherical coordinates of each measuring point to the key target three-dimensional trajectory prediction module 5;

for a multi-wheeled truck as key target traveling in the same direction and located in the left front, at least three outer wheels on the right side of the multi-wheeled truck as key target are selected as measuring points;

for a multi-wheeled truck as key target traveling in the same direction and located in the right front, at least three outer wheels on the left side of the multi-wheeled truck as key target are selected as measuring points;

for a multi-wheeled truck as key target traveling in the same direction and located in the left rear, at least three outer wheels on the right side of the multi-wheeled truck as key target are selected as measuring points;

for a multi-wheeled truck as key target traveling in the same direction and located in the right rear, at least three outer wheels on the left side of the multi-wheeled truck as key target are selected as measuring points;

for a multi-wheeled truck as key target traveling in a reverse direction and located in the left front, at least three outer wheels on the left side of the multi-wheeled truck as key target are selected as measuring points;

for a multi-wheeled truck as key target traveling in a reverse direction and located in the right front, at least three outer wheels on the right side of the multi-wheeled truck as key target are selected as measuring points.

In the step b, during determining the spherical coordinates of key targets by the streaming media analysis module 2, the streaming media analysis module 2 performs real-time processing of the streaming media data of the vehicle driving environment sampled by the visual system in a form of streaming media, and determines the spherical coordinates $(r', \theta, \varphi)$ of key targets with a fixed camera coordinate positioning method, where $\theta$ and $\varphi$ are definite values respectively, and $r'$ is a value to be corrected. In the step d, during measuring the real spherical coordinates of key targets by the laser radar system, the laser radar system performs vector control on the laser through electro-optic effect, to detect corrected spherical coordinates $(r, \theta, \varphi)$ of key targets, and then obtains the real spherical coordinates of key targets.

The specific models of the above-mentioned electronic components do not need to be specified; they may be chosen from commercially available common products as long as they can meet the requirements of the present disclosure.

The purposes, technical solutions and beneficial effects of the present disclosure have been described in detail with reference to the specific embodiments described above. It should be understood that the above descriptions only refer to specific embodiments of the present disclosure but do not intend to limit the present disclosure. Any modifications, equivalent replacements, and improvements made within the spirit and principle of the present disclosure are all included in the protection scope of the present disclosure.

What is claimed is:

1. A laser radar driving environmental recognition system based on visual area guidance, comprising a visual system, a laser radar system, a data processor and a vehicle action control processor (6), wherein the data processor comprises:

a streaming media analysis processor (2), configured for analyzing and processing streaming media data of a vehicle driving environment sampled by the visual system, to classify and determine moving objects and stationary objects in the vehicle driving environment, and mark the moving objects as key targets and output spherical coordinates of key targets, the streaming media analysis processor (2) being configured for outputting data of the stationary objects to the vehicle action control processor (6);

a key target spherical coordinate data processor (3), configured for analyzing and processing spherical coordinate data of key targets output by the streaming media analysis processor (2), and outputting azimuth coordinates in the processed spherical coordinates of key targets to the laser radar system;

a key target three-dimensional trajectory prediction processor (5), wherein the laser radar system is configured for measuring real distances of the key targets, and outputting real spherical coordinates of key targets to the key target three-dimensional trajectory prediction processor (5), the key target three-dimensional trajectory prediction processor (5) being configured for generating real-time trajectory prediction data of key targets, and outputting the real-time trajectory prediction data of key targets to the vehicle action control processor (6), wherein the laser radar driving environmental recognition system is configured for implementing driving environmental recognition and feedback in such a method, the method comprising:

step a: sampling environmental streaming media of a vehicle driving environment through the visual system;

step b: sending by the visual system the sampled environmental streaming media data to the streaming media analysis processor (2), and analyzing and processing by the streaming media analysis processor (2) the environmental streaming media data sampled by the visual system to classify and determine moving objects and stationary objects in the vehicle driving environment, and mark the moving objects as key targets and output spherical coordinates of key targets;

outputting stationary object data of the streaming media analysis processor (2) to the vehicle action control processor (6), so that the vehicle action control processor (6) is capable of controlling driving status of vehicle according to the stationary object information;

meanwhile, outputting by the streaming media analysis processor (2) the spherical coordinate data of key targets to the key target spherical coordinate data processing processor (3);

step c: analyzing and processing by the key target spherical coordinate data processing processor (3) the spherical coordinates of key targets, and inputting azimuth coordinates in the processed spherical coordinates of key targets to the laser radar system;

step d: accurately measuring by the laser radar system the real distance of the key targets, and outputting the real spherical coordinates of key targets to the key target three-dimensional trajectory prediction processor (5);

step e: generating by the key target three-dimensional trajectory prediction processor (5) the real-time trajectory prediction data of key targets according to the real spherical coordinate data of key targets;

step f: outputting by the key target three-dimensional trajectory prediction processor (5) the real-time trajectory prediction data of key targets to the vehicle action control processor (6), so that the vehicle action control processor (6) is capable of controlling driving status of a first vehicle according to moving object information, wherein in the step b, during determining the spherical coordinates of key targets by the streaming media analysis processor (2), the streaming media analysis processor (2) performs real-time processing of the streaming media data of the vehicle driving environment sampled by the visual system in a form of streaming media, and determines the spherical coordinates (r', θ, φ) of key targets with a fixed camera coordinate positioning method, where θ and φ are definite values respectively, and r' is a value to be corrected;

wherein in the step d, during measuring the real spherical coordinates of key targets by the laser radar system, the laser radar system performs vector control on the laser through electro-optic effect, to detect corrected spherical coordinates (r, θ, φ) of key targets, and then obtains the real spherical coordinates of key targets.

2. The laser radar driving environmental recognition system based on visual area guidance according to claim 1, wherein in the step d, in case of a driving vehicle as one of the key targets, the laser radar system is configured to select four measuring points of the driving vehicle to measure distances, wherein the laser radar system accurately measures real distances of the above four measuring points of the driving vehicle, and outputs real spherical coordinates of the above four measuring points of the driving vehicle to the key target three-dimensional trajectory prediction processor (5), wherein two measuring points form a measuring point group and the above four measuring points form two measuring point groups; wherein, for the driving vehicle traveling in the same direction and located in the left front relative to the first vehicle, the above four measuring points are a right front wheel, a right rear wheel, a left rear light, and a right rear light of the driving vehicle, wherein the measuring point of right front wheel and the measuring point of right rear wheel form a measuring point group, and the measuring point of left rear light and the measuring point of right rear light form a measuring point group;

for the driving vehicle traveling in the same direction and located in the right front relative to the first vehicle, the above four measuring points are a left front wheel, a left rear wheel, a left rear light, and a right rear light of the driving vehicle, wherein the measuring point of left front wheel and the measuring point of left rear wheel form a measuring point group, and the measuring point of left rear light and the measuring point of right rear light form a measuring point group;

for the driving vehicle traveling in the same direction and located in the left rear relative to the first vehicle, the above four measuring points are a right front wheel, a right rear wheel, a left front light, and a right front light of the driving vehicle, wherein the measuring point of right front wheel and the measuring point of right rear wheel form a measuring point group, and the measuring point of left front light and the measuring point of right front light form a measuring point group;

for the driving vehicle traveling in the same direction and located in the right rear relative to the first vehicle, the above four measuring points are a left front wheel, a left rear wheel, a left front light, and a right front light of the driving vehicle, wherein the measuring point of left front wheel and the measuring point of left rear wheel form a measuring point group, and the measuring point of left front light and the measuring point of right front light form a measuring point group;

for the driving vehicle traveling in the same direction and located directly in front relative to the first vehicle, the above four measuring points are a left rear wheel, a right rear wheel, a left rear light, and a right rear light of the driving vehicle, wherein the measuring point of left rear wheel and the measuring point of right rear wheel form a measuring point group, and the measuring point of left rear light and the measuring point of right rear light form a measuring point group;

for the driving vehicle traveling in the same direction and located directly in the rear relative to the first vehicle, the above four measuring points are a left front wheel, a right front wheel, a left front light, and a right front light of the driving vehicle, wherein the measuring point of left front wheel and the measuring point of right front wheel form a measuring point group, and the measuring point of left front light and the measuring point of right front light form a measuring point group;

for the driving vehicle traveling in a reverse direction and located in the left front relative to the first vehicle, the above four measuring points are a left front wheel, a left rear wheel, a left front light, and a right front light of the driving vehicle wherein the measuring point of left front wheel and the measuring point of left rear wheel form a measuring point group, and the measuring point of left front light and the measuring point of right front light form a measuring point group;

for the driving vehicle traveling in a reverse direction and located in the right front relative to the first vehicle, the above four measuring points are a right front wheel, a right rear wheel, a left front light, and a right front light of the driving vehicle, wherein the measuring point of right front wheel and the measuring point of right rear wheel form a measuring point group, and the measuring point of left front light and the measuring point of right front light form a measuring point group.

3. The laser radar driving environmental recognition system based on visual area guidance according to claim 1, wherein in the step d, in case of a multi-wheeled truck as one of the key targets, the laser radar system is configured to select at least three measuring points of the same multi-wheeled truck as to measure distances, wherein the laser radar system accurately measures real distance of each measuring point of the multi-wheeled truck, and outputs real spherical coordinates of each measuring point to the key target three-dimensional trajectory prediction processor (5); wherein, for the multi-wheeled truck traveling in the same direction and located in the left front relative to the first vehicle, at least three outer wheels on the right side of the multi-wheeled truck are selected as measuring points;

for the multi-wheeled truck traveling in the same direction and located in the right front relative to the first vehicle, at least three outer wheels on the left side of the multi-wheeled truck are selected as measuring points;

for the multi-wheeled truck traveling in the same direction and located in the left rear relative to the first vehicle, at least three outer wheels on the right side of the multi-wheeled truck are selected as measuring points;

for the multi-wheeled truck traveling in the same direction and located in the right rear relative to the first vehicle, at least three outer wheels on the left side of the multi-wheeled truck are selected as measuring points;

for the multi-wheeled truck traveling in a reverse direction and located in the left front relative to the first vehicle, at least three outer wheels on the left side of the multi-wheeled truck are selected as measuring points;

for the multi-wheeled truck traveling in a reverse direction and located in the right front relative to the first vehicle, at least three outer wheels on the right side of the multi-wheeled truck are selected as measuring points.

4. The laser radar driving environmental recognition system based on visual area guidance according to claim 1, wherein the visual system comprises six vehicle-mounted cameras (1), respectively arranged in the middle of the upper end of a front windshield, the left side of the upper end of the front windshield, the right side of the upper end of the front windshield, the upper part of a A-pillar, the upper part of a B-pillar, and the middle of the upper end of a rear windshield of the first vehicle, the vehicle-mounted cameras (1) are all wide-angle cameras, with a field of view higher than 90 degrees.

5. The laser radar driving environmental recognition system based on visual area guidance according to claim 4, wherein a shooting frame rate of the vehicle-mounted cameras (1) is 30-50 frames, and the visual system has a data processing frequency of 30-50 Hz.

6. The laser radar driving environmental recognition system based on visual area guidance according to claim 1, wherein the laser radar system is a solid-state laser radar system, and the laser radar system comprises four high-precision positioning solid-state laser radars (4) arranged in the middle of the upper end of the front windshield, the upper part of a A-pillar, the upper part of a B-pillar, and the middle of the upper end of the rear windshield of the vehicle, and the high-precision positioning solid-state laser radars (4) are all solid-state optical waveguides phased array laser radars.

7. The laser radar driving environmental recognition system based on visual area guidance according to claim 1, wherein the stationary objects comprise stationary vehicles, lane edges, buildings, fire facilities, and traffic signs.

* * * * *